Nov. 23, 1965  J. P. SCHAUMBERGER  3,218,724
THREAD GAUGE UNIT
Filed Dec. 29, 1964
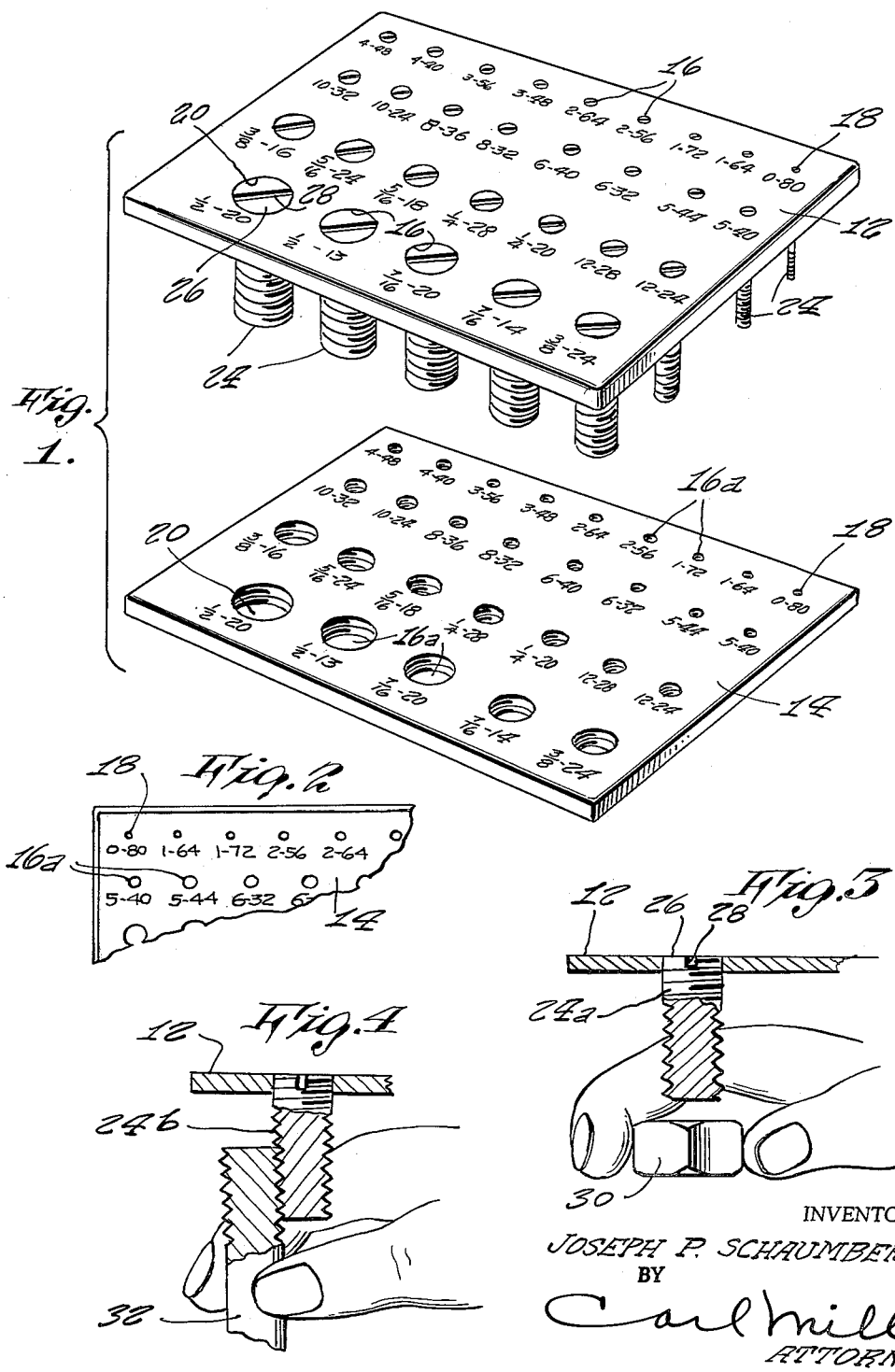
INVENTOR.
JOSEPH P. SCHAUMBERGER
BY
Carl Miller
ATTORNEY

United States Patent Office 3,218,724
Patented Nov. 23, 1965

3,218,724
THREAD GAUGE UNIT
Joseph P. Schaumberger, 405 Clifton Blvd., Clifton, N.J.
Filed Dec. 29, 1964, Ser. No. 421,799
1 Claim. (Cl. 33—199)

This invention relates to a thread gauge unit.

It is the principal object of this invention to provide a thread gauging device to enable the ready ascertaining of the size of the thread of a bolt or stud, as well as the size of the thread of a nut.

Another object of this invention is to provide two separable gauge plates, each having corresponding threaded openings arranged in rows and varying in size from a smallest to a largest threaded opening, with the threaded openings in axial registry when one plate is superposed over the other, there being threadedly engaged in each of the openings of the upper plate, a threaded stud and each extending the same length below the plate.

Another object of the invention is to have the lower gauge plate secured to the upper gauge plate for transport or storage by the threaded engagement of certain or all of the threaded studs of the upper gauge plate with corresponding threaded openings in the lower gauge plate.

A further object of the invention is to provide on each gauge plate adjacent each threaded opening, numerical indicia to indicate the size of the threaded opening.

A still further object of this invention is to form the upper end of each threaded stud with a slot for engagement by a screw driver, the studs being each threaded from end to end with the upper slotted end flat so as to lie in the plane of the upper surface of the upper gauge plate.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claim.

FIGURE 1 is an exploded perspective rear view of the pair of upper and lower gauge plates of the thread gauging device.

FIGURE 2 is a fragmentary plan front view of a portion of the underside one of the gauge plates.

FIGURE 3 is a vertical detail sectional view of the upper gauge plate and attached threaded stud showing the same in use to gauge the thread of a nut.

FIGURE 4 is a vertical detail sectional view similar to FIGURE 3 showing one manner of gauging the thread of a bolt or screw.

Referring to the drawings in detail, the thread gauging device 10 is shown to comprise an upper gauge plate 12 and a lower gauge plate 14, each rectangular in shape and of corresponding dimensions.

Provided in the upper gauge plate 12 are rows of openings 16 progressively ranging from small to large from one end of a first row as at 18 to the end of the last row as at 20. Each opening is threaded with a specific size of thread ranging from the smallest as at opening 18 to the largest as at opening 20, with the size of each thread for each opening, and the diameter thereof being suitably marked on the upper face of the gauge plate 12 by identifying indicia as shown. Preferably the gauge plate 12 is of substantial thickness to accommodate sufficient and proper threading of each opening.

The lower gauge plate 14 is provided with identical threaded openings 16 corresponding to the threaded openings 16 of the upper gauge plate 12, such that upon superposing the upper gauge plate 12 over the lower gauge plate 14, corresponding threaded openings will be in axial registry. The threaded openings in the lower gauge plate 14 are each identified by indicia in the same manner as that shown for the upper gauge plate.

Carried by the upper gauge plate 12 are threaded gauging studs 24, there being a stud for each threaded opening. The studs 24 are preferably each of the same length and threaded from end to end with the upper end 26 of each flat and provided with a screw driver receiving slot 28. The studs 24 are placed in the upper gauge plate 12 with their flat ends 26 flush with the upper surface of the gauge plate 12, as shown. The depending or projecting length of each threaded stud 24 thus forms a gauging element. In FIGURE 3, there is shown a nut 30 held in the hand, to be gauged by the threaded stud 24$^a$. If the nut properly fits the threads of the stud 24$^a$, the size of the threads of the nut may then be determined by a reading of the indicia for the stud 24$^a$. In FIGURE 4, there is shown a screw or bolt 32, the threads of which are gauged by the threads on the stud 24$^b$ by a meshing of the threads. If the threads properly mesh, the size of the screw or bolt 32 is determined from a reading of the indicia for the stud 24$^b$.

Another manner of finding the size of the threads on a bolt or screw, is by selecting by trial the proper threaded opening in the lower gauge plate 14. Proper threaded engagement of screw or bolt 32 in its mating threaded opening will give the size of the same by a reading of the indicia for that threaded opening.

While the size indicia of the threads are shown on the top surface of each of gauge plates 12 and 14, it is to be understood that the same may also be provided on the bottom surface of each gauge plate as shown in FIGURE 2. This will facilitate a reading of the selected indicia from either side of the gauge plate.

While certain novel features of my invention have been shown and described and are pointed out in the annexed claim, it will be understood that various omissions, substitutions and changes in the forms and details of the device illustrated and in its operation can be made by those skilled in the art without departing from the spirit of the invention.

Having described my invention, what I claim as new and desire to secure by Letters Patent is:

A thread gauging device comprising:
(a) first gauge plate,
(b) a plurality of threaded gauging studs carried by said first gauge plate, certain of a different thread size and diameter and others of a different thread size and the same diameter,
(c) each said stud being of the same length and threaded from one end to the other,
(d) said one end of each stud being flat and formed with a screw driver receiving slot,
(e) a plurality of threaded openings in said first gauge plate, each receiving in threaded engagement therewith a gauging stud of a corresponding thread size and diameter,
(f) identifying indicia indicating the thread size and diameter of each gauging stud marked on the upper and lower surface of the first gauge plate adjacent each threaded opening, whereby the flat ends of all of the studs are arranged to lie flush with the plane of the upper surface of said first gauge plate and removal of any one gauging stud from said gauge plate is effected by rotation of the same in either a clockwise or anti-clockwise direction,
(g) a second gauge plate similar in shape to said first gauge plate, (h) a like plurality of threaded openings in said second gauge plate, each corresponding in thread size and diameter to a corresponding threaded opening in said first gauge plate such as to lie in axial registry one with the other when said first gauge plate is superposed over said second gauge plate, (i) identifying indicia indicating the thread size and diameter of each threaded opening marked on the upper and lower surface of said second gauge plate adjacent each said opening and corresponding to the identifying indicia on said first gauge plate, (j) said second gauge plate being connected to said first gauge plate by the threaded engagement of certain or all of said gauging studs in corresponding threaded openings of said second gauge plate, whereby on separation of said second gauge plate, a thread size of a bolt or screw may be determined by meshing with the threads of any selected gauging stud or by threaded engagement with any selected threaded opening in said separate gauge plate, and the thread size of a nut may be determined by its threaded engagement with a selected gauging stud, and (k) said threaded openings in each of said gauge plates are arranged in parellel rows with the smallest disposed at one end of a first row and progressively increasing in size throughout the rows with the largest disposed at an opposite end of the last row.

References Cited by the Examiner

UNITED STATES PATENTS

| | | | |
|---|---|---|---|
| 2,528,431 | 10/1950 | Greenberg | 33—199 |
| 2,728,145 | 12/1955 | Holladay | 33—199 |
| 2,830,380 | 4/1958 | Rumonoski | 33—199 |

OTHER REFERENCES

Stewart Screw and Nut Locator (advertisement), Stewart Manufacturing Co., Washington 9, D.C.

ISAAC LISANN, *Primary Examiner.*